US012586573B1

(12) United States Patent
　　Tabak et al.

(10) Patent No.: US 12,586,573 B1
(45) Date of Patent: Mar. 24, 2026

(54) SENTIMENT-BASED CONVERSATION HOTSPOT DETECTION

(71) Applicant: Amazon Technologies, Inc., Seattle, WA (US)

(72) Inventors: Gizem Tabak, San Carlos, CA (US); Masahito Togami, San Jose, CA (US); Michael Mark Goodwin, Scotts Valley, CA (US); Amalavoyal Chari, Los Altos, CA (US); Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 18/375,167

(22) Filed: Sep. 29, 2023

(51) Int. Cl.
　　*G10L 15/18*　　　(2013.01)
　　*G08B 21/18*　　　(2006.01)
　　*G10L 15/04*　　　(2013.01)
　　*G10L 15/22*　　　(2006.01)

(52) U.S. Cl.
　　CPC .......... *G10L 15/1815* (2013.01); *G10L 15/04* (2013.01); *G10L 15/22* (2013.01); *G08B 21/182* (2013.01)

(58) Field of Classification Search
　　CPC ..... G10L 15/1815; G10L 15/04; G10L 15/22; G08B 21/182
　　See application file for complete search history.

(56) References Cited

U.S. PATENT DOCUMENTS

| | | | |
|---|---|---|---|
| 10,854,191 B1* | 12/2020 | Geramifard | ............. G10L 15/16 |
| 11,055,119 B1* | 7/2021 | Silverstein | ............... G06N 3/08 |
| 12,159,647 B1* | 12/2024 | Churgin | .................. G10L 17/14 |
| 12,254,878 B1* | 3/2025 | Rottmann | ............... G10L 15/26 |
| 2013/0080212 A1* | 3/2013 | Li | ........................... G06Q 50/01 |
| | | | 705/7.38 |

(Continued)

OTHER PUBLICATIONS

Giannini, E., "Using aspect-based sentiment analysis for voice and video conversation with Symbl.ai", symbl.ai, Aug. 16, 2021, in 8 pages. Retrieved online: https://symbl.ai/developers/blog/using-aspect-based-sentiment-analysis-for-voice-and-video-conversation-with-symbol-al/.

(Continued)

*Primary Examiner* — Michael Colucci
(74) *Attorney, Agent, or Firm* — Knobbe Martens Olson & Bear LLP

(57) ABSTRACT

A system may include machine learning models. A system may receive audio information representing an utterance of a conversation session. A system may divide the audio information into a plurality of audio portions. A system may evaluate a first audio portion using a tone-based sentiment analysis model to generate sentiment probabilities. A system may determine a first positive sentiment probability exceeds a threshold. A system may generate a textual representation of the first audio portion. A system may evaluate the textual representation using a topic identification model to generate a topic result indicating a topic. A system may evaluate a second audio portion using the tone-based sentiment analysis model to generate second sentiment probabilities. A system may determine a second positive sentiment probability does not exceed the threshold.

20 Claims, 7 Drawing Sheets

(56) References Cited

U.S. PATENT DOCUMENTS

| | | | |
|---|---|---|---|
| 2016/0132900 A1* | 5/2016 | Duggal | G06F 16/958 |
| | | | 705/7.29 |
| 2017/0243382 A1* | 8/2017 | Banerjee | G06Q 10/107 |
| 2018/0253734 A1* | 9/2018 | Henry | G06Q 30/0631 |
| 2018/0293224 A1* | 10/2018 | Bostick | G10L 15/1822 |
| 2021/0110895 A1* | 4/2021 | Shriberg | G16H 10/20 |
| 2021/0390491 A1* | 12/2021 | Ellison | G10L 15/1807 |
| 2022/0067384 A1* | 3/2022 | Kaushik | G06N 3/0442 |
| 2022/0343250 A1* | 10/2022 | Tremblay | G06F 3/0482 |
| 2024/0098091 A1* | 3/2024 | Choi | H04L 51/21 |
| 2024/0380842 A1* | 11/2024 | Noorizadeh | H04M 3/5175 |
| 2025/0086389 A1* | 3/2025 | Saranathan | G06F 40/30 |

OTHER PUBLICATIONS

Pascual, F., "Guide to Aspect-Based Sentiment Analysis", MonkeyLearn, Mar. 8, 2019, in 16 pages. Retrieved online: https://monkeylearn.com/blog/aspect-based-sentiment-analysis/.

* cited by examiner

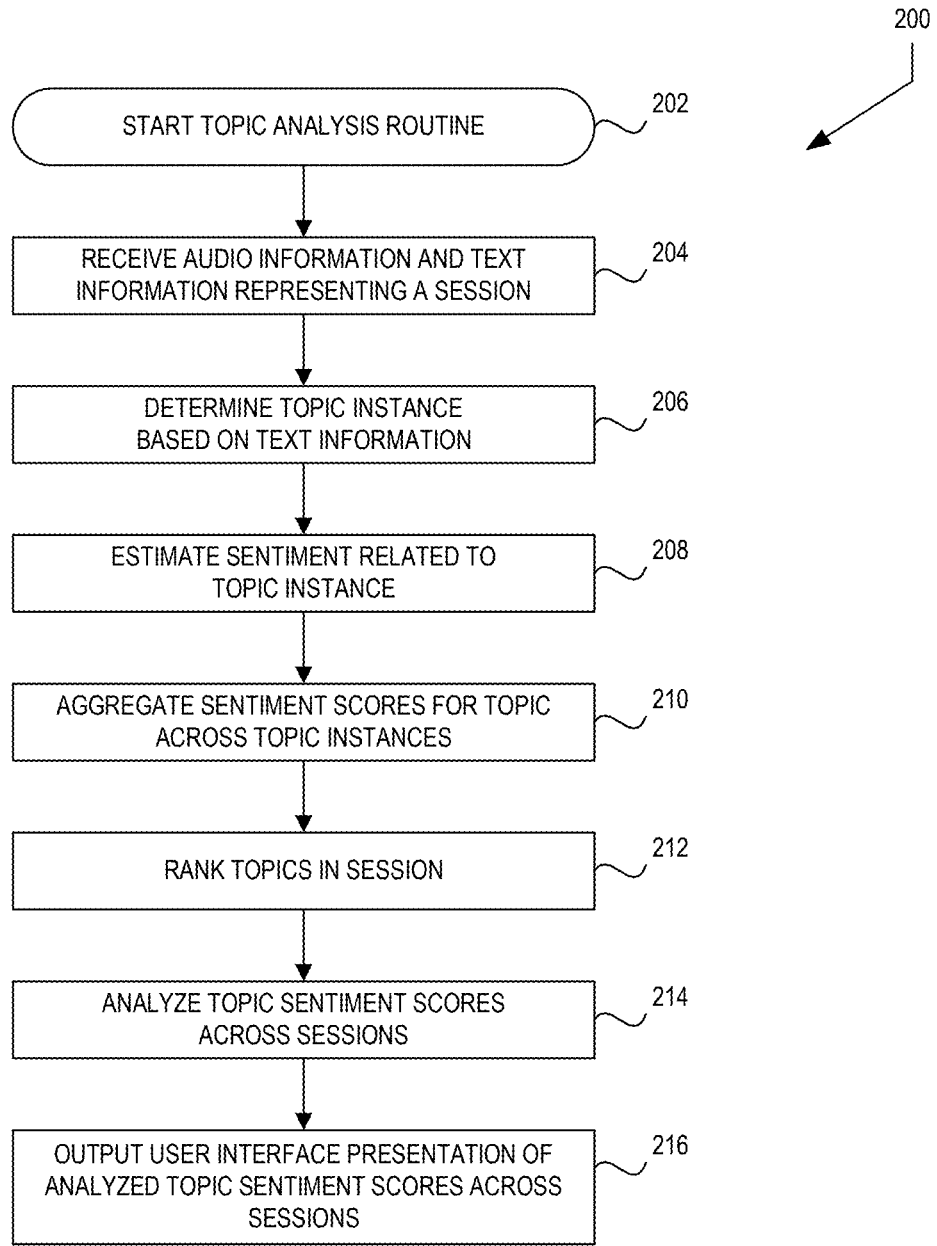

200

START TOPIC ANALYSIS ROUTINE ⌒202

RECEIVE AUDIO INFORMATION AND TEXT INFORMATION REPRESENTING A SESSION ⌒204

DETERMINE TOPIC INSTANCE BASED ON TEXT INFORMATION ⌒206

ESTIMATE SENTIMENT RELATED TO TOPIC INSTANCE ⌒208

AGGREGATE SENTIMENT SCORES FOR TOPIC ACROSS TOPIC INSTANCES ⌒210

RANK TOPICS IN SESSION ⌒212

ANALYZE TOPIC SENTIMENT SCORES ACROSS SESSIONS ⌒214

OUTPUT USER INTERFACE PRESENTATION OF ANALYZED TOPIC SENTIMENT SCORES ACROSS SESSIONS ⌒216

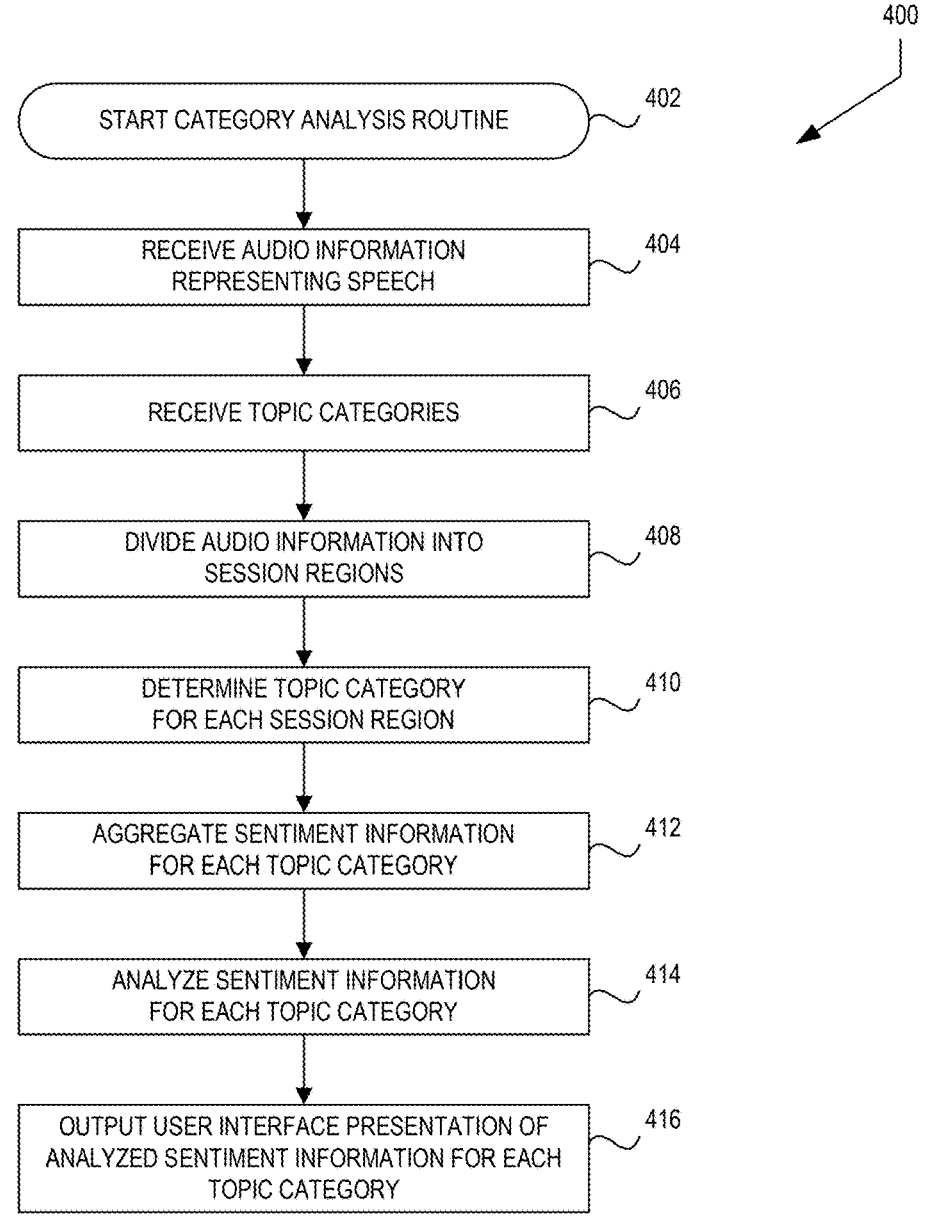

START CATEGORY ANALYSIS ROUTINE — 402

RECEIVE AUDIO INFORMATION REPRESENTING SPEECH — 404

RECEIVE TOPIC CATEGORIES — 406

DIVIDE AUDIO INFORMATION INTO SESSION REGIONS — 408

DETERMINE TOPIC CATEGORY FOR EACH SESSION REGION — 410

AGGREGATE SENTIMENT INFORMATION FOR EACH TOPIC CATEGORY — 412

ANALYZE SENTIMENT INFORMATION FOR EACH TOPIC CATEGORY — 414

OUTPUT USER INTERFACE PRESENTATION OF ANALYZED SENTIMENT INFORMATION FOR EACH TOPIC CATEGORY — 416

*Fig. 4*

CUSTOMER SUPPORT

CUSTOMER: I recently purchased a set of pans.

[NEUTRAL-PRODUCT]

AGENT: How can I help you with your pans?

CUSTOMER: I like them, but one does not get as hot as I expected.

[POSITIVE-PRODUCT]    [NEGATIVE-FUNCTION]

SENTIMENT-BASED CONVERSATION HOTSPOT DETECTION

BACKGROUND

Computing systems may utilize a processed audio input to determine a sentiment associated with an audio input, such as a conversation. For example, a computing system may receive a transcript of a portion of a conversation and apply the transcript as input to a machine learning model config- ured to determine an associated sentiment. The system may then present the determined associated sentiment to a user.

BRIEF DESCRIPTION OF THE DRAWINGS

Embodiments of various inventive features will now be described with reference to the following drawings. Throughout the drawings, reference numbers may be re- used to indicate correspondence between referenced ele- ments. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 2 is a flow diagram of an illustrative routine for analyzing sessions comprising one or more utterances based on topics according to some embodiments.

FIG. 4 is a flow diagram of an illustrative routine for analyzing sessions comprising one or more utterances based on topic categories according to some embodiments.

DETAILED DESCRIPTION

Figure 1:
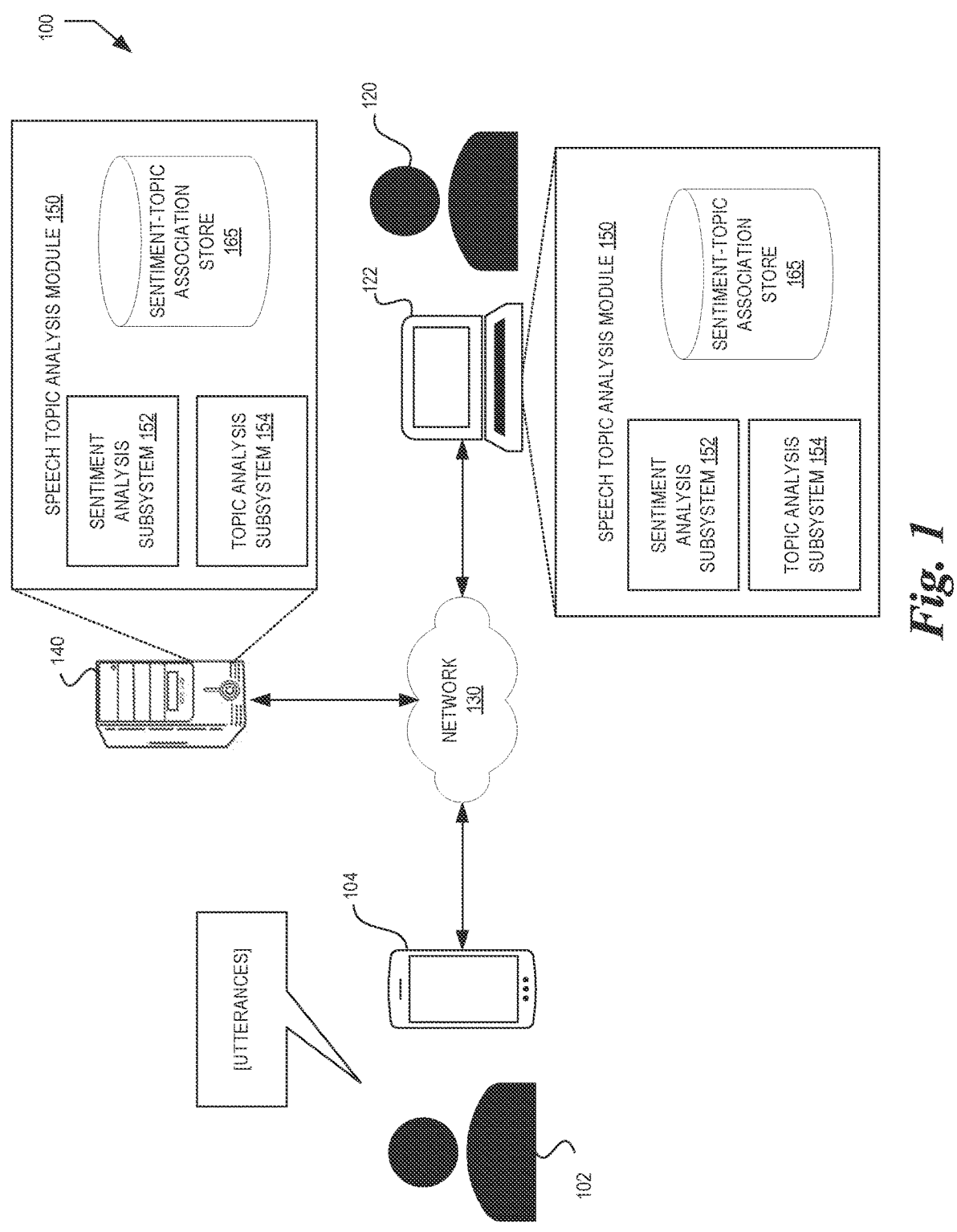
FIG. 1 is a diagram of illustrative data flows within an example system for speech topic analysis according to some embodiments.

The present disclosure relates to identifying sentiments and topics associated with the sentiments in an audio con- versation to generate sentiment-topic associations. The determined sentiments and topics may be used to identify hot sentiments and hot topics within the audio conversation. The determined sentiments, topics, and sentiment-topic associations may be used in a variety of applications. For example, they may be presented to a customer service representative participating in a conversation with a cus- tomer.

Some systems allow for identifying sentiments and topics within a conversation based on converting the conversation to a textual form (e.g., a transcript) using automated speech recognition software. Such systems then analyze the textual form of the conversation for sentiments and topics. For example, a ten-minute conversation is entirely converted to a transcript, and then the transcript is provided to a text- based sentiment determination system and a text-based topic determination system. This process requires generating a transcript of the entire conversation, a resource-intensive process that is inefficient when only certain sentiments— expressed in only subsets or portions of the conversation— are of interest to an end user. Additionally, by analyzing a transcript of the conversation for sentiment, additional indi- cators of sentiment (e.g., voice tone) are lost, potentially leading to incorrect sentiment determinations.

Some aspects of the present disclosure address some or all of the issues noted above, among others, by using audio information of a conversation session to identify one or more sentiments of the conversation session, allowing for the use of additional information (e.g., voice tone) in deter- mining a sentiment. The present disclosure then uses textual information of the conversation session (e.g., a transcript) to identify one or more topics of the conversation session. Advantageously, the textual information may only be gen- erated for portions of the conversation session associated with sentiments of interest, thereby reducing the processing required to generate a transcript of portions of the conver- sation not of interest. Sentiments of interest may include hot sentiments and/or hot spots. Hot spots of sentiments of interest may be associated with an intensity or severity of the associated sentiment, and may be determined based on the sentiment probability associated with at least one instance of the sentiment of interest. Additionally, processing time and resources are saved by only identifying topics for sentiments of interest. For example, the sentiment analysis may be configured to identify positive, neutral, and negative senti- ments. The system may then associate time windows of a conversation with each sentiment by generating a sentiment probability or sentiment score. When only positive and negative sentiments are of interest, or when only sentiments of at least a threshold degree of positivity or negativity are of interest, the system may then generate transcript segments only for time windows associated with those positive and negative sentiments. The system may forgo generating tran- scripts for time windows associated only with neutral sen- timents, or associated with positive or negative sentiments failing to satisfy a threshold degree. The system can proceed to determine a topic for the generated transcript segment(s).

Additional aspects of the system allow for determining sentiment-topic associations, and presenting the sentiment- topic associations to a user. The sentiment-topic associations may be presented in different ways, for example as heat maps, word clouds, or in a narrative text form (e.g., at 30 seconds the customer said "I bought this three months ago," neutral sentiment probability for this statement is 0.8).

In some embodiments, the system may process audio data or information, for example audio information generated by a microphone of a communications device, representing utterances that occur during a conversation such as a cus- tomer contact. Processing the audio may include generating a first version of the audio information and a second version of the audio information. For example, processing the audio may include generating a textual representation (e.g., a transcript) of the utterances, or acoustic features of the audio, such as tonal information (also referred to herein as "tone information"). Further, processing the audio informa- tion may include identifying an audio portion (e.g., a portion of the audio information containing speech), or dividing the audio information into a set or plurality of audio portions, each audio portion comprising a part of the audio informa- tion. A first audio portion of a plurality of audio portions may comprise a first part of the audio information, and a second audio portion of the plurality of audio portions may com- prise a second part of the audio information. The audio information of the second audio portion may comprise some, all, or none of the audio information of the first audio portion. In some embodiments, the processing of the audio may be performed by one or more machine learning models.

The system may analyze a first processed element of the audio, for example the tonal information, to determine one or more probability values, where each probability value is associated with a sentiment, indicating that the one or more sentiments are being expressed by the customer. Analyzing the first processed element of the audio may be performed by one or more machine learning models, for example a machine learning model may be an audio-based sentiment model. The probability values for at least two sentiments may be used to determine a sentiment score, for example by calculating a difference between a negative sentiment probability and a positive sentiment probability. A probability value or sentiment score may then be compared by the system to a threshold value. When at least one probability value or sentiment score exceeds the threshold value, the system may output an indication of the sentiment expressed by the customer based on the analysis of the first processed element.

The system may also analyze a second processed element, for example the textual representation, to determine a topic. Additionally, the system may receive a plurality of topic categories, and then categorize determined topics into such categories. For example, the system may receive topic categories of "communication, color, cost, lifetime," and then determine the topic (e.g., expensive) identified based on the second processed element is most closely associated with the topic category "cost." The identification of the most closely associated topic category may be based on evaluating a cosine similarity between each topic category and the topic, where the highest cosine similarity indicates the most closely associated topic category. Advantageously, categorizing the determined topics into the plurality of topic categories enables various useful output displays, such as word clouds or heat maps, by limiting the number of objects displayed to a user and improving readability. Further, the performance of the system may be improved by reducing the problem space a topic classifier machine learning model operates in. Analyzing the second processed element may be performed by one or more machine learning models, for example a machine learning model may be a text-based topic detection model.

When a sentiment and a topic or topic category have been identified by the system, a sentiment-topic association may be stored by the system with a timing data indicating the time in the conversation where the sentiment-topic association was identified. The timing data may include one or more timestamps, such as timestamps for a beginning and/or an end time within the conversation. Alternatively, the timing data may indicate a beginning time and a known time window for analysis may then be used to determine the time window in which the sentiment-topic association was identified. The system may present the sentiment-topic association (e.g., to a customer service agent or data analyst). For example, the system may present the probability values and/or sentiment scores determined from the analysis of the first processed element, and the topic and/or topic category determined from the analysis of the second processed element.

As used herein, the terms "evaluate" and "evaluating" may refer to comparing or otherwise analyzing one or more values. For example, evaluating may refer to analyzing a value with respect to one or more criteria and determining whether the criteria are satisfied. As another example, evaluating may refer to comparing two or more values to each other and determining which value is greatest, least, or satisfies another criterion. As a further example, evaluating may refer to providing two or more probability vectors to a machine learning model as input and generating, by the machine learning model, an output based on the two or more probability vectors, where the output may be a new output vector representing application of machine-learned parameters of the machine learning model to the or more probability vectors.

In some embodiments, a sentiment analysis machine learning model may be configured to receive audio of an utterance or session as input and generate at least one probability associated with a sentiment, where the probability indicates a likelihood the associated sentiment is being expressed in the conversation. Additionally, or alternatively, the sentiment analysis model may provide as output one or more classification results (e.g., binary classification results for one or more different sentiments). Additionally, the sentiment analysis model may provide as output intermediate variables, for example an output of an encoder of the sentiment analysis model.

In some embodiments, additional properties associated with a conversation, such as a customer contact (e.g., metadata, conversation history, information provided by a customer, etc.), may be provided as input to one or more of the machine learning models determining sentiment probabilities, and/or topics. In some embodiments, the additional properties may be concatenated to the embeddings of the input signal provided to the machine learning model. For example, the machine learning model may be initialized with the additional properties stored in memory. In some embodiments, the additional properties may be provided to layers other than or in addition to the input layer of a neural network-based machine learning model.

In some embodiments, hot topics may be determined based on analyzing sentiment-topic associations across two or more conversations. For example, a ranked list of topics may be generated based on estimating high and low values for sentiment scores associated with each topic, and clustering such information across a plurality of sessions (e.g., calculating a mean sentiment score for the topic across sessions). In another example, high values for sentiment scores associated with topics (e.g., indicating a magnitude of positive sentiment associated with a topic) may be clustered across calls, and the aggregated topics and associated sentiment scores may be used to generate a ranked list of positive topics. In another example, low values for sentiment scores associated with topics (e.g., indicating a magnitude of negative sentiment associated with a topic) may be clustered across conversations, and the aggregated topics and associated sentiment scores may be used to generate a ranked list of negative topics. In another example, small-magnitude sentiment scores associated with topics (e.g., indicating a neutral sentiment associated with a topic), may be clustered across conversations, and the aggregated topics and associated sentiment scores may be used to form a list of neutral topics.

While the description of the system herein may refer to one sentiment analysis model and one topic analysis model generally, it should be recognized that any number of sentiment analysis and/or topic analysis models may be used by the system. Additionally, while each machine learning model may be referred to as analyzing a different aspect of the customer contact (e.g., a transcript, tonal information, etc.) various embodiments may implement two or more machine learning models analyzing the same aspect of the customer contact. Additionally, the description of the system herein may refer to an order of the machine learning models (e.g., a first machine learning model and a second machine learning model), but such references are to aid in discussion only and are not intended to limit the order or number of machine learning models of the system.

The description above may refer to customer contacts, customers, customer service representatives, and the like for the purpose of facilitating the description, but it should be recognized that the present system may be used in various additional environments. For example, the system may determine a sentiment of a caller utilizing an emergency hotline (e.g., calling 911) and present the determined sentiment to an operator of the emergency hotline.

Generally described, a session may refer to a conversation comprising one or more utterances made by one or more users of the system. An interaction between users may include one or more sessions, for example multiple support calls made by a first user to a customer service center. Sessions may be associated, for example based on a common user or user attribute, common topic or topic category, timeframe within which the sessions occur, or any other information generated by the system when analyzing the session.

As used herein, a customer contact refers to any conversation, session, or other communication related to an issue, question, or other topic of interest. The contact may be initiated by, received from, or otherwise include communication with a customer or other entity. The contact may take any of a variety of forms. For example, a contact may include a conversation (e.g., a telephone call, video call, online voice chat, etc.) initiated by a customer regarding an issue with a product. Customer contacts may be initiated for any of a variety of reasons, such as contacts for refunds, replacements, exchanges, service requests, and the like. The example contacts described herein are illustrative only, and are not intended to be limiting. In some embodiments, a sentiment analysis system may be used with any or all of these contacts, other types of contacts, some combination thereof, etc. For example, the system may determine a sentiment of a speaker in a conversation outside the context of a phone conversation, such as a conversation occurring during an in-person meeting.

As used herein, a sentiment score refers to a numerical value representing a sentiment at a specific time or window of time in a session, for a specific topic, or for a specific topic category. In some embodiments, the sentiment score is determined based on the difference between a positive sentiment probability and a negative sentiment probability for the time, topic, or category. Sentiment scores may be used in place of sentiment probabilities, for example to simplify the display of sentiment information to a user.

Various aspects of the disclosure will be described with regard to certain examples and embodiments, which are intended to illustrate but not limit the disclosure. Although aspects of some embodiments described in the disclosure will focus, for the purpose of illustration, on particular examples of topics, sentiments, and the like, the examples are illustrative only and are not intended to be limiting. In some embodiments, the techniques described herein may be applied to additional or alternative types of topics, sentiments, and the like. Additionally, any feature used in any embodiment described herein may be used in any combination with any other feature or in any other embodiment, without limitation.

Example Speech Topic Analysis

With reference to an illustrative example, FIG. 1 shows an example system 100 implementing speech sentiment and topic analysis. The system 100 comprises a first user 102, a first communication device 104 associated with the first user 102, a network 130, a second user 120, a second communication device associated with the second user 120, and a communication server 140.

The first communication device 104 may be, for example, a smartphone computing device, a mobile telephone device, a landline telephone device, or any other communication device configured to receive speech information from the first user 102 (e.g., by a microphone integrated into or in communication with the first communication device 104), and transmit the received speech information to the second communication device 122 (e.g., by transmitting speech information to the network 130).

In some embodiments, the second communication device 122 comprises a speech topic analysis module 150. The second communication device 122 may, for example, be a smartphone computing device, a laptop computing device, a desktop computing device, or any other communication device configured to receive speech information from the first communication device 104. The second communication device 122 may additionally be configured to present an output of the speech topic analysis module 150 to the second user 120. For example, the second communication device 122 may include or be in communication with a display, speaker, one or more indicators capable of illumination in response to the output of the speech topic analysis module 150, and/or any other device capable of indicating the output of the speech topic analysis module 150 to the second user 120.

In some embodiments, the communication server 140 comprises a speech topic analysis module 150. The communication server 140 may, for example, be a third-party communication server facilitating a communication between the first communication device 104 and the second communication device 122. The communication server 140 may be configured to provide the output of the speech topic analysis module 150 to the second communication device 122. For example, the communication server 140 may be a customer service communications server facilitating a customer service call between the first user 102 and the second user 120. The communication server 140 may receive information associated with the utterances from the first communication device 104 and, using the speech topic analysis module 150 of the communication server 140, determine a topic-sentiment association based on an utterance or a plurality of utterances. Further, in this example, the communication server 140 may transmit the output of the speech topic analysis module 150 to the second communication device 122 via the network 130.

The network 130 is a network configured to receive speech information from the first communication device 104 and transmit the received speech information to the second communication device 122 and/or the communication server 140. For example, the network 130 may include any one or more communications networks, such as the Internet. The network 130 may be any combination of local area network ("LAN") and/or a wireless area network ("WAN") or the like. In some embodiments, the various components of the system 100 may, in various implementations, communicate with one another directly or indirectly via any appropriate communications links (e.g., one or more communications links, one or more computer networks, one or more wired or wireless connections, the Internet, any combination of the foregoing, and/or the like).

The speech topic analysis module 150 comprises a sentiment analysis subsystem 152, a topic analysis subsystem 154, and a sentiment-topic association store 165.

In some embodiments, the sentiment analysis subsystem 152 comprises a machine learning model configured to receive an audio representation of speech information (e.g., from the first communication device 104) and generate a sentiment label associated with the speech information and/ or a probability value indicating the likelihood the determined the sentiment is accurate. Further, the sentiment analysis subsystem 152 may determine a sentiment associated with speech information without converting the speech information to a textual form. The sentiment analysis subsystem 152 may generate a plurality of probability values, each probability value indicating the likelihood the audio information (e.g., tone, emphasis, volume differential, etc.) indicates a respective sentiment. In some embodiments, the sentiment analysis subsystem 152 determines a sentiment associated with each of a plurality of topics, the topics associated with portions of the speech information. Such embodiments are discussed in further detail below in relation to FIGS. 2 and 4. Alternatively, the sentiment analysis subsystem 152 determines one or more sentiments for the speech information and an associated time window of the speech information for each of the sentiments.

For example, the sentiment analysis subsystem 152 may be configured to generate as output four sentiment probability values, one probability value associated with each of positive sentiment, negative sentiment, mixed sentiment, and neutral sentiment. In some embodiments, the sentiment analysis subsystem 152 may then associate each probability value with a topic. Additional or fewer sentiment probability values may be generated by the sentiment analysis subsystem 152, or alternative sentiments may be associated with a probability value (e.g., sarcastic sentiment, humorous sentiment, fearful sentiment, frustrated sentiment, or any other sentiment which may be conveyed by speech). In some embodiments, the received audio representation of speech information may be converted by a machine learning model of the sentiment analysis subsystem 152 to a latent representation for input to the machine learning model. A probability value generated by the sentiment analysis subsystem 152 may be referred to as a confidence level of the machine learning model.

Additionally, the sentiment analysis subsystem 152 may identify hot sentiments, for example by calculating sentiment scores using the determined sentiment probabilities. Timestamps in a session may then be identified as indicating hot sentiments based on sentiment score values exceeding a threshold value. For example, a positive sentiment probability for a timestamp may be 0.8, a negative sentiment probability for the timestamp may be 0.2, and the threshold may be 0.5. The sentiment analysis subsystem 152 may then calculate the difference between the positive sentiment probability and the negative sentiment probability at the timestamp, 0.6 in this example, to determine a sentiment score for the timestamp. The sentiment score is then compared to the threshold, and in this example because the sentiment score of 0.6 exceeds the threshold of 0.5, the timestamp is associated with a label of being a hot sentiment. In some embodiments, the topic analysis subsystem 154 may determine a topic being discussed during the timestamp (e.g., within a window of 10 seconds before and 10 seconds after the timestamp) and the speech topic analysis module 150 may label the topic as a hot topic, or the sentiment-topic association for the timestamp as a hot sentiment-topic association.

The topic analysis subsystem 154 may use a machine learning model configured to receive a textual representation of speech information and generate an indication of the topics represented within such speech. In some embodiments, the textual representation may be converted to a latent representation for input to the machine learning model. The topic analysis subsystem 154 may provide as output one or more topic classes for the speech information. In some embodiments, the labels may be selected from a pre-existing set of topic classes, and the topic classes may be provided by a user of the system 100 or generated by the topic analysis subsystem 154 (e.g., by a machine learning model of the topic analysis subsystem 154). Alternatively, the topic analysis subsystem 154 may be configured to generate a set of topic classes based on the textual representation of speech information. Additionally, the topic analysis subsystem 154 may be configured to associate topic classes with a plurality of time windows, each time window associated with a sentiment. The plurality of time windows for which the topic analysis subsystem 154 generates topics may be associated with less than all of the sentiments for which the sentiment analysis subsystem 152 is capable of generating probabilities. For example, the topic analysis subsystem 154 may generate a topic class only for time windows associated with a positive or negative sentiment, but not time windows associated with a neutral sentiment. Additionally, a threshold may be used to determine time windows for which the topic analysis subsystem 154 generates a topic to associate with the time window. For example, the topic analysis subsystem 154 may only determine a topic for portions (e.g., windows of time) of the speech information for which the positive sentiment probability value exceeds a threshold probability value.

In some embodiments, the topic analysis subsystem 154 comprises a large language model (LLM) configured to accept a prompt comprising natural language as input in textual form. For example, the prompt may comprise the textual representation of speech information. Additionally, the topic analysis subsystem 154 may append a request to the textual representation of speech information to instruct the LLM to provide output in a desired format. For example, the topic analysis subsystem 154 may append "generate a list of topics ordered by frequency from the following text" to the textual representation of speech information to generate a prompt. The prompt may then be provided as input to the LLM, such that the LLM provides a frequency-ordered list of topics in the speech information as output to the topic analysis subsystem 154 for further processing.

Further, the topic analysis subsystem 154 may store or receive a set of topic categories. For example, a user of the system 100 may identify a set of topics of interest to the user (e.g., for a travel service the user may identify a set of travel-related topic categories), and the topic analysis subsystem 154 may identify topics in a session, and then assign some or all of the identified topics to a topic category of the set of topic categories. Alternatively, the topic categories may be the set of hot topics identified by the topic analysis subsystem 154.

Assigning identified topics to a topic category may be done by a machine learning model. The machine learning model may be configured to receive text information as input, and generate embeddings from the text information. The topic analysis subsystem 154 may then determine the similarities between the embeddings generated from topics and embeddings generated from topic categories. For example, by determining a cosine similarity between an embedding generated from a portion of a transcript associated with a topic and the embeddings generated from each topic category. The topic analysis subsystem 154 may then assign the topic to the topic category with the highest cosine similarity between the embedding of the topic and the embedding of the topic category. In some embodiments, the machine learning model may be a sentence embedder model used to extract topics directly from a textual representation (e.g., a transcript) of a session. Advantageously, a sentence embedder model may be efficient when grouping information across separate sessions.

The topic analysis subsystem 154 may identify hot topics from the session. Where a plurality of topic categories are being analyzed by the topic analysis subsystem 154 topic categories may be used to label hot topics. For example, as described above, a cosine similarity may be used to determine the similarity between words in a session or topics identified in a session to a topic category. A time window within the session may be selected by the topic analysis subsystem 154 (e.g., a rolling 10-second time window, a non-overlapping 15-second time window, etc.) and the topics identified in that window may be compared to the topic categories to determine cosine similarity values. The topic category with the highest cosine similarity to the topics of the time window may then be identified as a hot topic (e.g., the topic category with the highest sum of cosine similarity values in the time window).

Additionally, the topic analysis subsystem 154 may generate a heatmap or other display to visually indicate to a user the similarity between each topic of the session and each topic category.

In some embodiments, the topic analysis subsystem 154 is configured to receive an audio representation of speech information in a session and comprises a machine learning model configured to generate a textual representation of the speech information from the audio representation.

The sentiment-topic association store 165 is a memory configured to store sentiment-topic associations generated by the speech topic analysis module 150, and information relating to sentiment-topic associations. For example, the sentiment-topic association store 165 may store all sentiment-topic associations generated by the topic analysis subsystem 154 and/or sentiment analysis subsystem 152 for a session. Further, the sentiment-topic association store 165 may store frequency data, time data for portions of a session associated with a topic, timestamp data for portions of a session associated with a sentiment, hot topics determined from a set of topics identified by the topic analysis subsystem 154, hot sentiments as determined by the sentiment analysis subsystem 152, and/or timing data indicating the times in a session where hot topics and/or hot sentiments are found.

While a single session is referred to throughout the discussion herein, it should be understood that the system 100 may be applied to audio data associated with a plurality of sessions, and associations may be determined and analyses may be performed by some or all components of the speech topic analysis module 150 to determine topics, sentiments, topic-sentiment associations, or any other output discussed in relation to the components of the system 100. Additional insights may be determined from analysis of a plurality of sessions, for example a common topic may be identified as eliciting a similar sentiment from different users across sessions.

Example Session Analysis Routines

Figure 7:
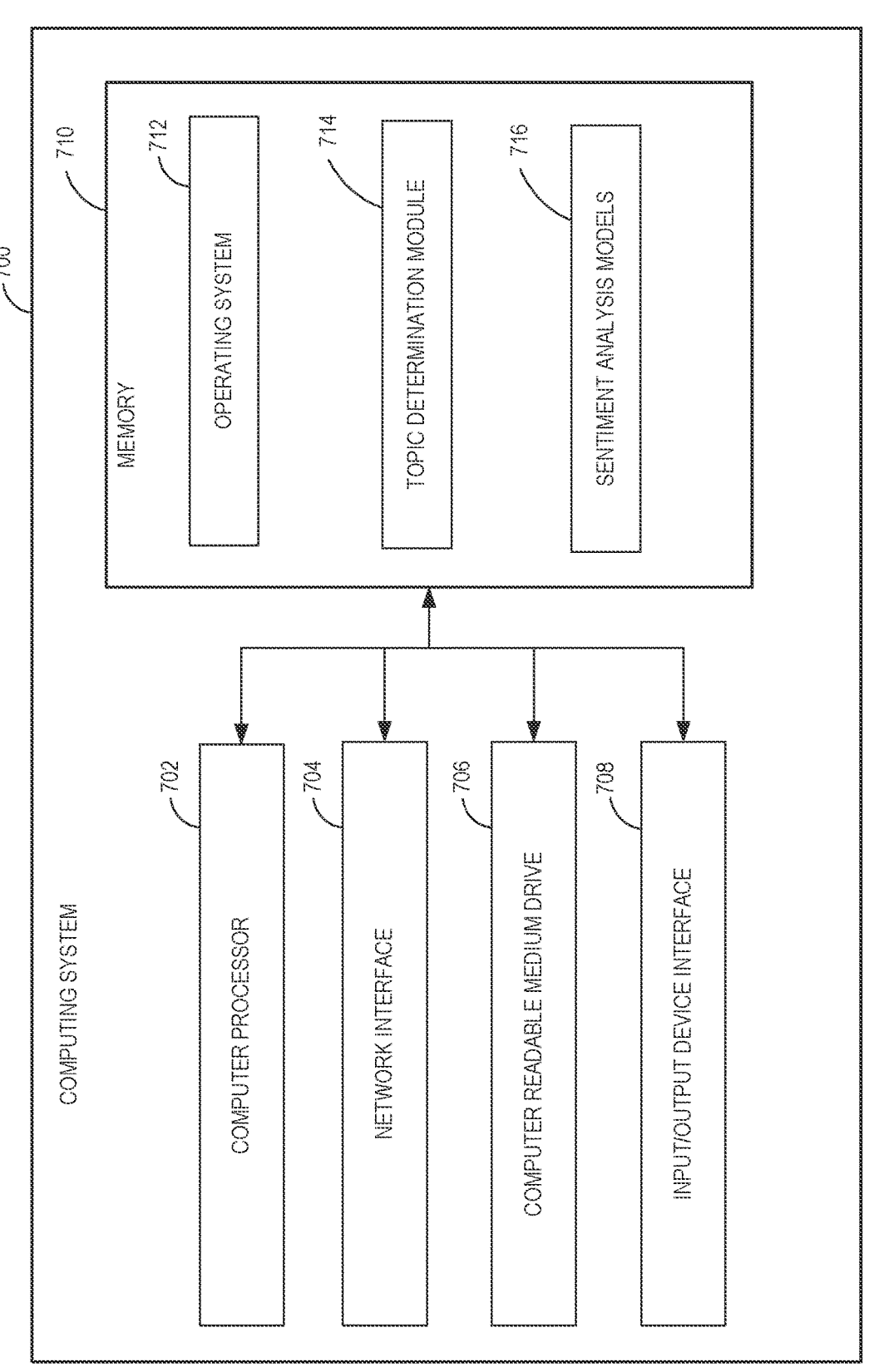
FIG. 7 is a block diagram of an illustrative computing system configured to generate topic-sentiment associations according to some embodiments.

When a routine is initiated, a set of executable program instructions stored on one or more non-transitory computer-readable media (e.g., hard drive, flash memory, removable media, etc.) may be loaded into memory (e.g., random access memory or RAM) of a computing system, such as the computing system 700 shown in FIG. 7, and executed by one or more processors. In some embodiments, the routines or portions thereof may be implemented on multiple processors, serially or in parallel.

FIG. 2 illustrates example routine 200 for analyzing sessions comprising one or more utterances using a topic-first approach. In a topic-first approach, topic instances are identified within a conversation, for example based on a conversation transcript, and when topic instances have been identified a sentiment is determined for some or all of the topic instances. Advantageously, the system may only identify sentiments for topics determined to be of interest, or topics appearing within the conversation over a threshold number of times, thereby reducing the number of sentiments to be determined by the system. Reducing the number of sentiments to be determined may reduce the processing resources required to generate useful output displays indicating sentiment information associated with topics of interest. The routine 200 begins at block 202. The routine 200 may begin in response to an event, such as an initiation of a communication session between a first user 102 and a second user 120. For example, the first user 102 may be a customer using a first communication device 104 to call a support center, and the routine 200 may begin when the second user 120 answers the call, for example by accepting the call using the second communication device 122.

At block 204, audio information representing speech in a session is received, for example by the speech topic analysis module 150 of the second communication device 122 or the speech topic analysis module 150 of the communication server 140. Additionally, at block 204, the speech topic analysis module 150 receives text information representing the speech information of the session, for example a transcript generated by an automated speech recognition system. Alternatively, in embodiments where the topic analysis subsystem 154 comprises a machine learning model configured to generate a textual representation of speech information, the topic analysis subsystem 154 may receive the audio information of the session and generate the text information.

At block 206, a topic instance within the session is determined based on the text information, for example by the topic analysis subsystem 154. Identifying the topic instance may comprise identifying a time window (e.g., a 10 second rolling window of time, a sentence, or a portion of uninterrupted speech by a user), and processing by the topic analysis subsystem 154 the textual information for utterances within the time window to determine a topic associated with the time window. The topic instance may then comprise both time information and topic information. In some embodiments, identifying the topic instance may further comprise determining a topic category to which the topic associated with the time window may be assigned, as described previously herein. When a topic instance within the session has been determined, the routine 200 moves to block 208.

At block 208, a sentiment associated with the topic instance is determined. Identifying the sentiment associated with the topic instance may be performed by the sentiment analysis subsystem 152. For example, the audio information for the time window associated with the topic instance may be provided to a machine learning model of the sentiment analysis subsystem 152 configured to determine a sentiment based on received audio information. In another example, the sentiment analysis subsystem 152 may be configured to perform hybrid sentiment analysis. Further to this example, the hybrid sentiment analysis may be performed by analyzing the received audio information in a first modality (e.g., voice tone-based sentiment analysis, text-based sentiment analysis, etc.). If a confidence in a determined sentiment, or a value of a sentiment probability of interest, is below a threshold score, then the hybrid sentiment analysis of the sentiment analysis subsystem 152 analyzes the received audio information in a second modality (e.g., if the first modality was voice tone-based sentiment analysis, the second modality may be text-based sentiment analysis). The sentiment analysis subsystem 152 may then generate a sentiment-topic association for the topic instance, and may store the sentiment-topic association in the sentiment-topic association store 165. When a sentiment related to the topic instance has been determined, the routine 200 may move to block 210, or repeat blocks 206 and 208 for some or all of the session to generate a plurality of sentiment-topic associations for the session. When a sentiment has been related to topic instances of interest (e.g., all topic instances, topic instances within a set of hot topic categories, etc.) the routine 200 then moves to block 210.

Figure 5:
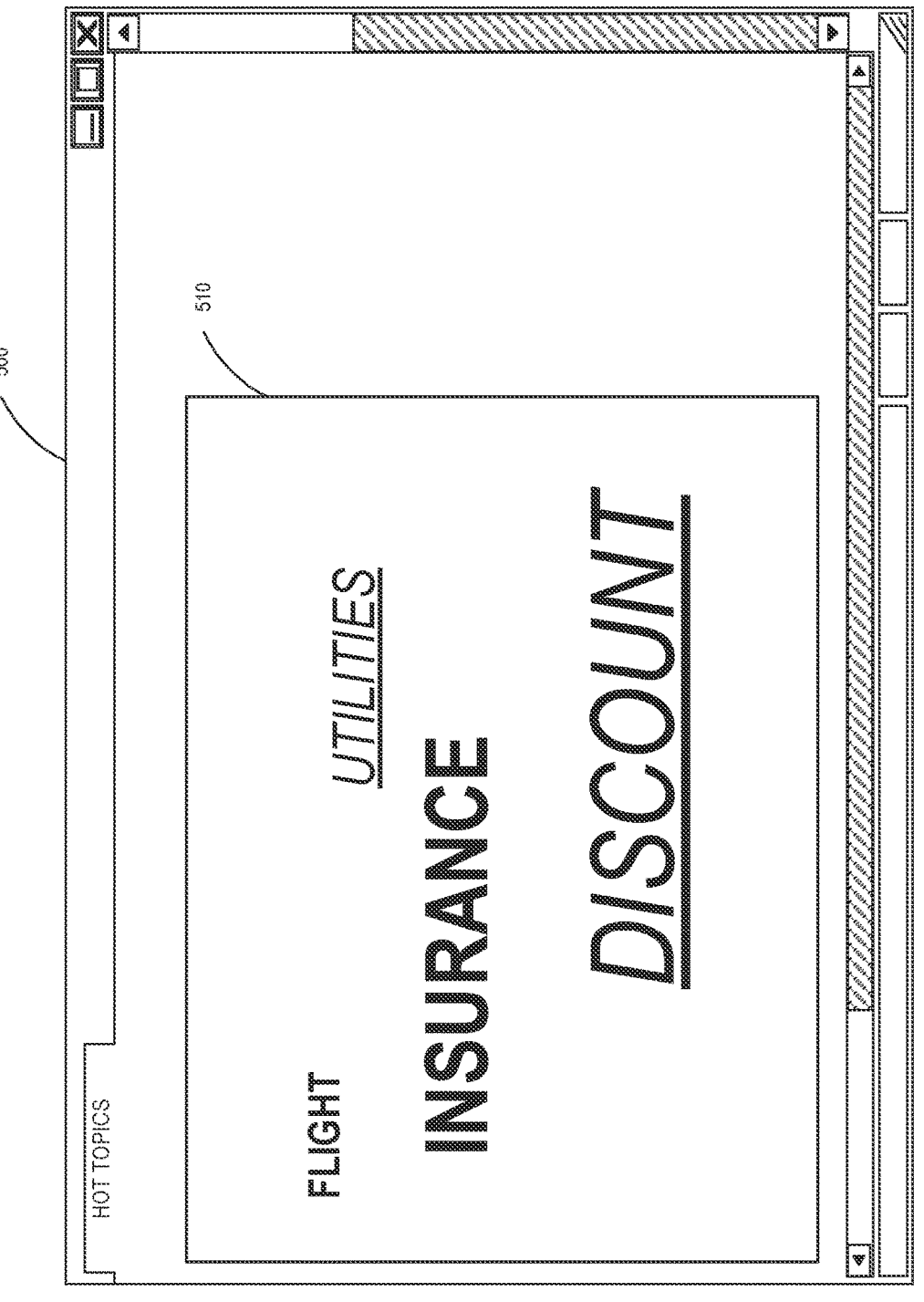
FIG. 5 is an illustrative diagram of a user interface according to some embodiments.

At block 210, the sentiment scores for a topic are aggregated across topic instances. For example, a mean sentiment for the topic across all topic instances associated with the topic in a session may be determined by the speech topic analysis module 150. A mean sentiment may be determined for each sentiment associated with the topic, for a sentiment with the highest probability value, or a subset of sentiments determined to be of interest. Alternatively, sentiment frequency information for some or all sentiments for the topic may be determined by the speech topic analysis module 150. The sentiment information may in some embodiments be presented to the second user 120 as one or more sentiment probabilities and/or a sentiment score. The sentiment information may be presented to the second user 120 as a histogram, heat map, word cloud as shown in FIG. 5, graph indicating sentiment changes over time (e.g., a line graph of sentiment scores where values above the x axis represent the positive sentiment probability being greater than 0, values below the x axis represent the negative sentiment probability being greater than 0, and values further to the right of the y axis represent sentiments later in the session), or in any other manner allowing the second user 120 to understand the sentiment information associated with the topic. Block 210 may then repeat for each topic in the session, each hot topic in the session, or each topic category in the session. When the sentiment scores for topics across all topic instances in a session have been determined, the routine 200 moves to block 212.

At block 212, the topics in a session are ranked. For example, the topics in a session may be ranked by frequency, by sentiment probability, or based on any other information associated with the topic by the speech topic analysis module 150. When the topics in the session have been ranked, the routine 200 moves to block 214.

At block 214, the sentiment scores associated with topics across a plurality of sessions are analyzed. For example, sentiment-topic associations for a plurality of sessions stored in the sentiment-topic association store 165 may be analyzed by the speech topic analysis module 150 to determine the most common sentiment associated with a topic, the sentiment with a highest mean sentiment probability for a topic, the sentiment with the highest median sentiment probability for a topic, the sentiment with the lowest mean or median sentiment probability for a topic, or the sentiment with the highest sentiment probability across topics instances for the topic.

At block 216, the speech topic analysis module 150 outputs information for a user interface presentation of the topic sentiment scores across sessions. For example, the speech topic analysis module 150 may generate instructions for displaying a user interface presentation which includes an indication of a most common sentiment-topic association, a sentiment with a highest mean probability for a topic, or a heat map indicating sentiment values for a plurality of sentiment-topic associations. The second communication device 122 may display the user interface presentation generated by the speech topic analysis module 150.

Figure 3:
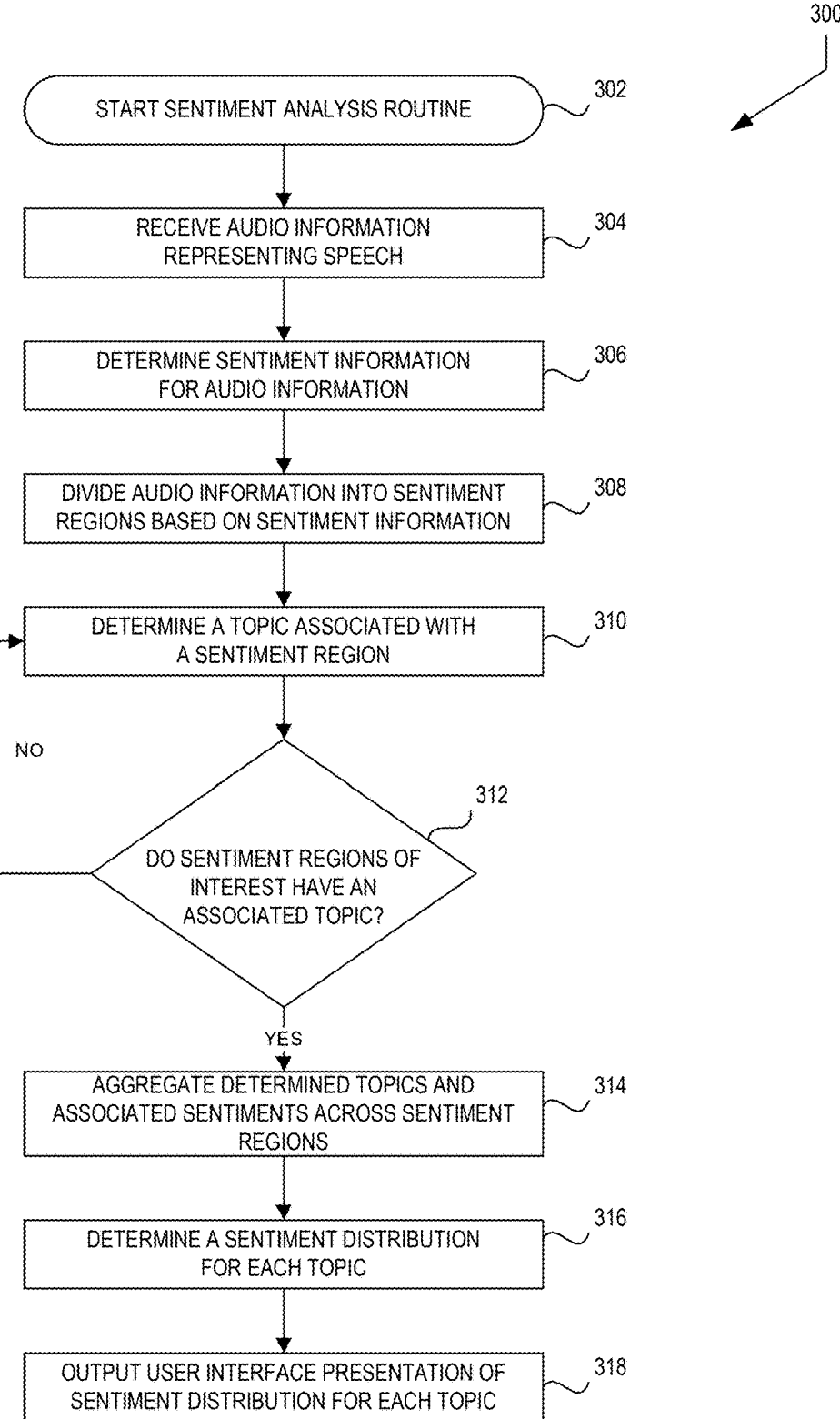
FIG. 3 is a flow diagram of an illustrative routine for analyzing sessions comprising one or more utterances based on sentiments according to some embodiments.

FIG. 3 illustrates example routine 300 for analyzing sessions comprising one or more utterances using a sentiment-first approach. The sentiment-first approach differs from routine 200 and routine 400 in that sentiments are first determined for a conversation, and then topics are determined only for portions of the conversation associated with sentiments of interest (e.g., highly positive or highly negative sentiments). In some embodiments, a threshold sentiment probability or sentiment of interest may be provided to the system. In such embodiments, only conversation portions associated with a sentiment of interest having a sentiment probability above the threshold sentiment probability are converted to text and provided to a machine learning model determining a topic for the conversation portion. Advantageously, converting only conversation portions associated with a sentiment of interest to text reduces the computation required to perform topic analysis by reducing the transcription required. Further, determining topics for conversation portions associated with sentiments of interest allows for faster analysis of the conversation with the same computing resources, enabling a greater range of computing devices to generate sentiment-topic associations in substantially real-time. Providing sentiment-topic association information in substantially real-time may enable use of the speech topic analysis module 150 for purposes such as customer service support, which may not be practical for systems transcribing and analyzing entire conversations. Additionally, analyzing sentiment-topic associations only for conversation portions associated with a sentiment of interest reduces the computation necessary to produce relevant, useful output, such as a word cloud or heat map indicating sentiment-topic associations.

The routine 300 begins at block 302. The routine 300 may begin in response to an event, such as an initiation of a communication session between a first user 102 and a second user 120. For example, the first user 102 may be a customer using a first communication device 104 to call a support center, and the routine 300 may begin when the second user 120 answers the call, for example by accepting the call using the second communication device 122.

When the routine 300 has started, the routine 300 moves from block 302 to block 304. At block 304, audio information representing speech in a session is received, for example by the speech topic analysis module 150 of the second communication device 122 or the speech topic analysis module 150 of the communication server 140. When the audio information has been received, the routine 300 moves to block 306.

At block 306 sentiment information is determined for the audio information received at block 304, for example by the sentiment analysis subsystem 152. Sentiment information may be determined for some or all of the audio information received. The sentiment analysis subsystem 152 may determine a plurality of sentiments for the audio information. Each of the plurality of sentiments may be associated with a different time window, for example a 10 second time window represented by timestamps indicating the beginning and end of the time window within the session. Alternatively, the time window may be dynamic, may represent time associated with speaking a sentence, a clause of a sentence, an uninterrupted period of speech by one user, or any other portion of the audio information. Associating a sentiment with a portion of the audio information may comprise indicating a sentiment probability for one or more sentiments for each portion. When a sentiment has been associated with each portion of the audio information, the routine 300 moves to block 308.

At block 308, the audio information is divided into sentiment regions based on the sentiments determined at block 306. For example, the sentiment analysis subsystem 152 may generate an indication of a time at which a sentiment begins to be expressed, and a time at which the sentiment is no longer expressed. Determining the sentiment is beginning to, or no longer, being expressed may be based on a threshold sentiment probability for a sentiment. In some embodiments, the threshold sentiment probability may be dynamic, for example where it is determined that all sentiments have a probability below a first threshold, the sentiment analysis subsystem 152 may generate a second threshold for the portion of the audio information, the second threshold based on the sentiment probability of some or all of the sentiments. It is possible that two or more sentiments may exceed the threshold. In response to two or more sentiments exceeding the threshold to be associated with a portion of the audio information, the sentiment analysis subsystem 152 may allow for two or more sentiment regions to overlap. Alternatively, the sentiment analysis subsystem 152 may determine that a first sentiment with a first sentiment probability greater than a second sentiment probability of a second sentiment is the sentiment associated with the region. When the audio information has been divided into sentiment regions, the routine 300 moves to block 310.

At block 310, a topic is determined for a sentiment region. For example, the topic analysis subsystem 154 may receive textual information associated with each sentiment region, and based on the received textual information determine a topic for the sentiment region. In some embodiments, the speech topic analysis module 150 may receive an indication of a sentiment of interest. The topic analysis subsystem 154 may then be provided with textual information only for sentiment regions associated with sentiments of interest. Advantageously, in such embodiments, speech to text conversion may only be performed on portions of the session associated with a sentiment of interest, and the topic analysis subsystem 154 may only determine topics for such regions, reducing the time and computational resources required to perform the desired sentiment-topic association. When a topic has been determined for a sentiment region, a sentiment-topic association may be generated, for example by the topic analysis subsystem 154, and stored in the sentiment-topic association store 165. When a topic has been associated with a sentiment region, the routine 300 moves to block 312.

At block 312, a determination is made, for example by the speech topic analysis module 150, as to which sentiment regions a topic is to be determined and whether there are any such sentiment regions remaining. In some embodiments a topic may not be determined for each sentiment region of a session, but rather only for a subset of sentiment regions satisfying one or more criteria. Advantageously, this can reduce the total processing time and computing resources needed to execute routine 300. Sentiment regions for which a topic is to be determined may include sentiment regions of interest, sentiment regions identified as being associated with a hot sentiment or determined to be a sentiment hot spot (e.g., associated with a peak of positive sentiment, a valley of negative sentiment based on sentiment score, a sentiment score exceeding a threshold value, or a rate of change of sentiment). In some embodiments, all sentiment regions may be indicated to be sentiment regions for which a topic is to be determined. When sentiment regions that are of interest (e.g., indicate a sentiment a user has requested topic information for) remain without an associated sentiment-topic association, the routine 300 returns to block 310. Otherwise, if all sentiment regions of interest, or all sentiment regions, have a sentiment-topic association, the routine 300 moves to block 314.

At block 314, topics and their associated sentiment, for example as sentiment-topic associations, are aggregated across sentiment regions. For example, the speech topic analysis module 150 may determine a frequency with which a topic is associated with a sentiment region, a length of time of the session for which a topic was associated with a sentiment, a mean sentiment probability associated with a topic based on the sentiment probability associated with each sentiment region the topic is associated with, a median sentiment probability associated with a topic based on the sentiment probability associated with each sentiment region the topic is associated with, or any other aggregated information determined about the topics associated with each sentiment region requested by a user. When the sentiment-topic associations have been aggregated across sentiment regions, the routine 300 moves to block 316.

At block 316, a sentiment distribution is determined for each topic. For example, the speech topic analysis module 150 may receive a sentiment probability for each sentiment region a topic is associated with from the sentiment-topic association store 165. The speech topic analysis module 150 of this example may then generate a graph showing the change in sentiment associated with the topic over time during the session, for example a 2-dimensional scatter plot where a first axis or dimension represents sentiment score and a second axis or dimension represents the frequency of a topic within a conversation session or set of conversations. Additionally, the speech topic analysis module 150 may generate a separate sentiment distribution for each sentiment associated with a topic. In some embodiments, sentiment distributions across a plurality of sessions may be combined to generate a multi-session sentiment distribution for a topic.

At block 318, the speech topic analysis module 150 outputs information for a user interface presentation of the sentiment distribution for each topic. For example, the speech topic analysis module 150 may generate instructions for displaying a user interface with the sentiment distribution for at least one topic to the second communication device 122. The sentiment distribution may, in this example, be displayed as a histogram, a percentage indication of occurrence for some or all sentiments associated with a topic, or another visual indication of the sentiment distribution for the topic. The second communication device 122 may display the user interface presentation generated by the speech topic analysis module 150.

FIG. 4 illustrates example routine 400 for analyzing sessions comprising one or more utterances using a topic-driven approach. In a topic-driven approach, topic categories may be provided prior to analysis of a conversation or determined by clustering similar topics. The topic-driven approach differs from routine 300 and routine 200 in that individual topics are relevant for the purpose of associating conversation portions with known topic categories, but the identified topics may not be output by the speech topic analysis module 150. Advantageously, associating conversation with topic categories in a topic-driven approach improves the comparison of sentiment-topic associations across sessions by ensuring a common set of topics (the topic categories) are being compared across sessions. Additionally, a topic-driven approach may allow for visual output of topic information that is easier to understand for a user, for example by reducing the number of words to display in a word cloud (e.g., as shown in FIG. 5), or reducing the size of a heat map showing sentiment-topic associations.

The routine 400 begins at block 402. The routine 400 may begin in response to an event, such as an initiation of a communication session between a first user 102 and a second user 120. For example, the first user 102 may be a customer using a first communication device 104 to call a support center, and the routine 400 may begin when the second user 120 answers the call, for example by accepting the call using the second communication device 122.

When the routine 400 has started, the routine 400 moves from block 402 to block 404. At block 404, audio information representing speech in a session is received, for example by the speech topic analysis module 150 of the second communication device 122 or the speech topic analysis module 150 of the communication server 140. When the audio information has been received, the routine 400 moves to block 406.

At block 406, topic categories are received. For example, the second user 120 may provide a plurality of topic categories of interest to the second user 120 to the speech topic analysis module 150. In some embodiments, the topic categories may be determined based on the session. For example, a prompt comprising a textual representation of the audio information of the session and a request to generate topic categories in natural language may be provided as input to an LLM. The speech topic analysis module 150 may then receive the topic categories generated by the LLM. Alternatively, the topic categories may be determined by a machine learning model of the topic analysis subsystem 154 configured to determine topics from textual information and cluster the topics into topic categories. When topic categories have been received, the routine 400 moves to block 408.

At block 408, the audio information is divided into session regions. For example, the audio information may be divided into sentiment regions as described above in relation to block 308 of the routine 300. Alternatively, a textual representation of the audio information may be used by the topic analysis subsystem 154 to generate a plurality of topic regions, each topic region indicating a time window of the session during which an associated topic is being referred to by a user. In another example, session regions may be determined based on portions of the audio information where a user of interest (e.g., a customer) is speaking, with each session region beginning when the user of interest begins to speak and ending when the user of interest stops speaking for a period of time (e.g., when a second user speaks). Additionally, a session region may be determined based on a user speaking for at least a minimum amount of time. Another option for dividing the audio information into session regions is defining a session region based on a change in the active speaker. When the audio information has been divided into session regions, the routine 400 moves to block 410.

At block 410, a topic category is determined for each session region. For example, the topic analysis subsystem 154 may compare each topic for each sentiment-topic association associated with a session region to each topic category by converting the topic and the topic categories into embeddings. A cosine similarity may then be generated for each topic-topic category pair, and the topic-topic category pair with the highest cosine similarity may indicate the topic category for the topic-sentiment association of the region. When a topic category has been determined for each session region, the routine 400 moves to block 412.

At block 412, determined topics categories and the associated sentiment information from the sentiment-topic association assigned to topic categories is aggregated for each topic category, similarly to the aggregation of sentiment information for topics discussed in relation to block 314 of routine 300. When the sentiment information for each topic category has been aggregated, the routine 400 moves to block 414.

At block 414, the sentiment information for each topic category is analyzed. For example, sentiment distributions may be determined for each topic category by the topic analysis subsystem 154, similar to the determination of sentiment distributions for topics in block 316 of routine 300.

Figure 6:
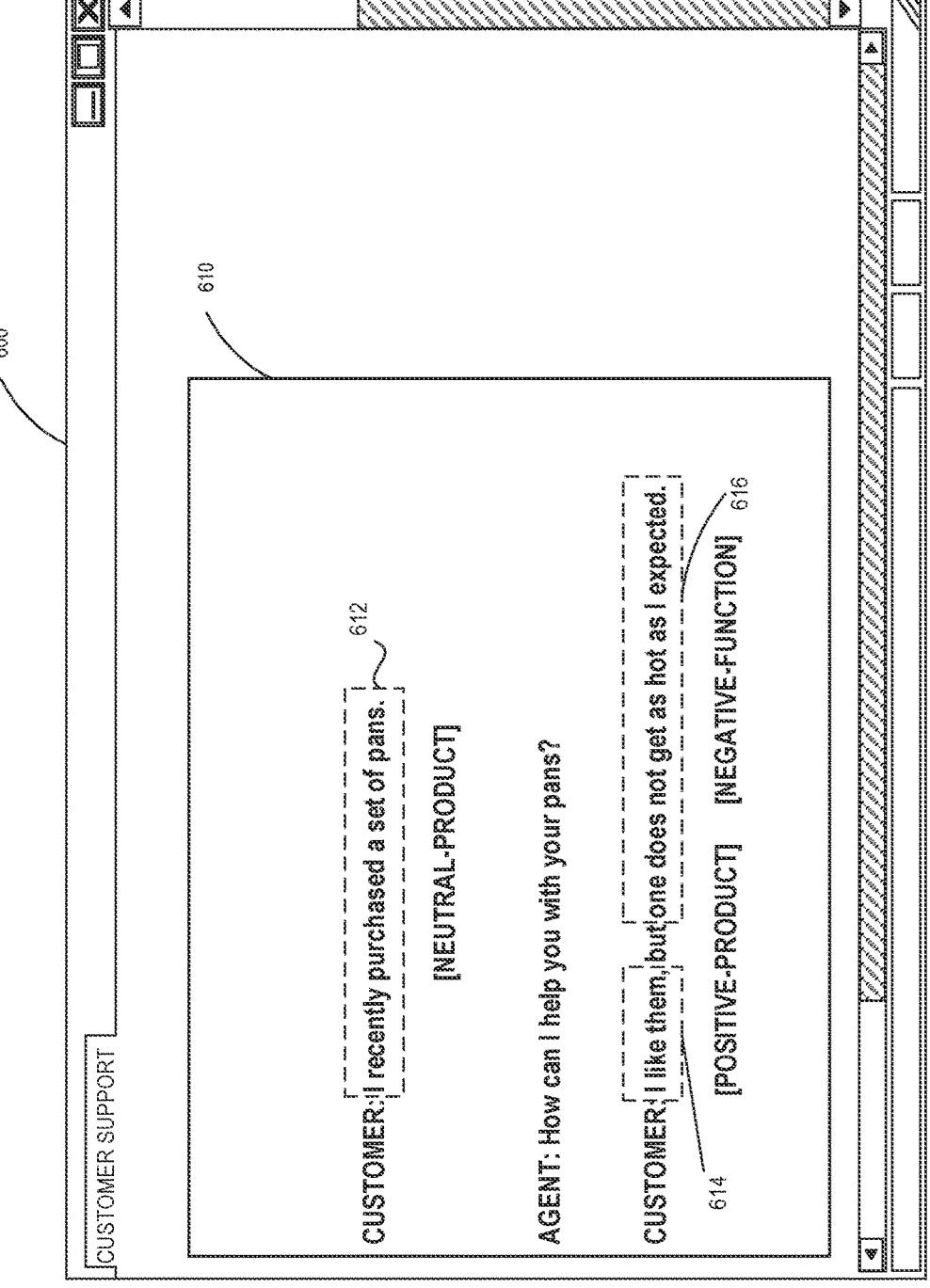
FIG. 6 is an illustrative diagram of a user interface according to some embodiments.

At block 416, the speech topic analysis module 150 outputs information for a user interface presentation of the sentiment distributions for each topic category. For example, the speech topic analysis module 150 may generate instructions for displaying a user interface presentation which includes a word cloud indicating sentiment frequency and sentiment type for each topic category. The second communication device 122 may display the user interface presentation generated by the speech topic analysis module 150.
Example User Interfaces FIGS. 5 and 6 represent user interfaces for presenting sentiment-topic associations to a user. For example, a user interface generated based on customer support conversations may be presented to a product seller, marketplace operator, and/or customer service representative to enable a better understanding of common issues with a product which may be addressed. Additionally, the user interface may allow for improvement of support documentation associated with a product, for example by suggesting common issues which could be addressed in a frequently asked questions notice on a product page or seller website. In another example, some topics or sentiment scores determined within a customer service contact setting may be appropriate for escalation, and may be identified by an escalation indicator defining a sentiment score associated with a topic which should result in an escalation alert. The escalation alert then indicates to a support representative that the customer contact should be escalated, for example as a popup alert window on a display. Then, when a customer contact is ongoing, the system may determine the topic or sentiment score deemed appropriate for escalation has been identified in the customer's call, and the system may alert a customer service representative to escalate the call. User interfaces described herein may be presented in real time during the conversation, or substantially real time, for example due to delay in processing input audio to generate display information of the user interface.

FIG. 5 illustrates an example user interface 500 displaying a word cloud indicating sentiment-topic association information provided to a user. The user interface 500 comprises a word cloud display 510. The word cloud display 510 indicates the frequency with which a topic is identified, and/or a sentiment associated with the topic. In some embodiments, the word cloud display 510 may include varied display characteristics (e.g., different font families, sizes, colors, bolding, italics, underlining, location, orientation, etc.) for words or phrases to provide information for topics and/or topic categories based on sentiment-topic associations generated by the speech topic analysis module 150 from a plurality of sessions. In the present example, the size of a word indicates the frequency with which a topic category is identified by the speech topic analysis module 150, and the style of the text (e.g., bold, underline, italicize, etc.) indicates the sentiment associated with the text. Alternatively, color, animation, or other visual indications may be used to indicate the frequency a topic or topic category is identified, or the sentiment associated with the topic or topic category.

FIG. 6 illustrates an example user interface 600 displaying a customer support session 610 between a first user 102 (e.g., a customer) and a second user 120 (e.g., a customer service agent). The user interface 600 may be displayed on the second communication device 122. A transcript of the session is shown to aid in the present description, but it should be recognized that, as described previously herein, a transcript may not be generated for some or all of the session. The first statement 612 is analyzed by the sentiment analysis subsystem 152 and the topic analysis subsystem 154. A sentiment-topic association is then displayed to the second user 120 indicating the sentiment expressed by the first user 102 and a topic category for the first statement 612. The sentiment-topic association may have been stored in the sentiment-topic association store 165 and retrieved for display to the second user 120. The response of the second user 120 in this example is not analyzed by the speech topic analysis module 150, as the speech topic analysis module 150 may determine or receive an indication that only the utterances of the first user 102 are of interest. The speech topic analysis module 150 then analyzes the second utterance of the first user 102. The second utterance is divided into a first clause 614, and a second clause 616 for analysis by the speech topic analysis module 150. The sentiment analysis subsystem 152 and topic analysis subsystem 154 then generate sentiment-topic associations for the first clause 614 and the second clause 616. As shown, the speech topic analysis module 150 provides the sentiment-topic associations for display to the second user 120.

In some embodiments, the sentiment-topic associations may be presented as a topic or topic category with a color indicating the associated sentiment. Additional information may be displayed or otherwise indicated to the second user 120, for example the sentiment probability associated with a sentiment-topic association may be indicated as a number, size of text, or as a shading of a color associated with a sentiment (e.g., red may indicate negative sentiment, where lighter reds indicate lower negative sentiment probability and darker reds indicate higher negative sentiment probability).

Execution Environment

FIG. 7 illustrates various components of an example computing system 700 configured to implement various functionality described herein.

In some embodiments, the computing system 700 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing system 700 may be implemented as web services consumable via one or more communication networks. In further embodiments, the computing system 700 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a computing system 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SSDs"), flash drives, and/or other persistent non-transitory computer readable media; one or more input/output device interfaces 708; and one or more computer-readable memories 710, such as random access memory ("RAM") and/or other volatile non-transitory computer readable media.

The computer-readable memory 710 may include computer program instructions that one or more computer processors 702 execute and/or data that the one or more computer processors 702 use in order to implement one or more embodiments. For example, the computer-readable memory 710 can store an operating system 712 to provide general administration of the computing system 700. As another example, the computer readable memory 710 can store a topic determination module 714 for determining a topic and/or topic category associated with an utterance. As another example, the computer-readable memory 710 can store sentiment analysis models 716 for determining one or more sentiments associated with an utterance.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
computer-readable memory storing:
    a voice tone-based sentiment analysis model; and
    a topic identification model; and
one or more processors in communication with the computer-readable memory and configured by executable instructions to:
    receive audio information representing an utterance of a conversation session;
    divide the audio information into a plurality of audio portions;
    evaluate a first audio portion of the plurality of audio portions using the voice tone-based sentiment analysis model to generate a first positive sentiment probability, a first negative sentiment probability, and a first neutral sentiment probability for the first audio portion;
    determine the first positive sentiment probability exceeds a threshold;

generate a textual representation of the first audio portion;

evaluate the textual representation using the topic identification model to generate a topic result indicating a topic associated with the first audio portion;

evaluate a second audio portion of the plurality of audio portions using the voice tone-based sentiment analysis model to generate a second positive sentiment probability, a second negative sentiment probability, and a second neutral sentiment probability for the second audio portion;

determine the second positive sentiment probability does not exceed the threshold;

generate a sentiment distribution for the conversation session based on the first positive sentiment probability; and output a user interface presentation of the sentiment distribution.

2. The system of claim 1 wherein the one or more processors are further programmed by the executable instructions to:

generate a word cloud comprising first text representing the topic and second text representing a second topic, wherein a first display characteristic of the first text visually indicates a highest sentiment probability associated with the topic, wherein the highest sentiment probability is determined from the first positive sentiment probability, first negative sentiment probability, and first neutral sentiment probability, and wherein a second display characteristic of the second text visually indicates a second sentiment of interest associated with the second topic.

3. The system of claim 1 wherein the one or more processors are further programmed by the executable instructions to:

receive an escalation indicator comprising a topic of interest and a sentiment threshold associated with the topic of interest, the sentiment threshold indicating when an escalation alert should be generated;

determine the second negative sentiment probability exceeds the sentiment threshold;

generate a second textual representation of the second audio portion;

evaluate the second textual representation using the topic identification model to generate a second topic result indicating a second topic associated with the second audio portion;

determine the second topic is the same as the topic of interest; and generate an escalation alert based on determining the first positive sentiment probability exceeds the sentiment threshold.

4. The system of claim 1 wherein the one or more processors are further configured by the executable instructions to generate a sentiment-topic association between the first positive sentiment probability and the topic.

5. A computer-implemented method comprising:

under control of a computing device comprising one or more processors configured to execute specific instructions, receiving audio information representing one or more utterances occurring during a conversation;

determining, using an audio-based sentiment model and the audio information, a first subset of portions of the conversation associated with a sentiment of interest, wherein a second subset of portions of the conversation are not determined to be associated with the sentiment of interest;

determining, based on the first subset of portions of the conversation being associated with the sentiment of interest, to generate a textual representation of a conversation portion of the first subset of portions of the conversation;

generating the textual representation of the conversation portion;

determining, using a text-based topic detection model and the textual representation, a topic associated with the conversation portion;

generating output data representing an association of the topic and the sentiment of interest.

6. The computer-implemented method of claim 5, further comprising:

determining, based on the first subset of portions of the conversation being associated with the sentiment of interest, to generate textual representations of each conversation portion of the first subset of portions; and determining not to generate textual representations of a second conversation portion of the second subset of portions based on the second subset of portions not being determined to be associated with the sentiment of interest.

7. The computer-implemented method of claim 5, wherein determining the first subset of portions of the conversation are associated with the sentiment of interest comprises determining that the conversation portion is associated with a particular sentiment of a plurality of sentiments the audio-based sentiment model is configured to detect.

8. The computer-implemented method of claim 5, wherein determining the first subset of portions of the conversation are associated with the sentiment of interest comprises determining that the conversation portion is associated with a degree of a particular sentiment, the degree exceeding a threshold degree.

9. The computer-implemented method of claim 5, further comprising generating a word cloud comprising first text representing the topic and second text representing a second topic, wherein a first display characteristic of the first text visually indicates the sentiment of interest associated with the topic, and wherein a second display characteristic of the second text visually indicates a second sentiment of interest associated with the second topic.

10. The computer-implemented method of claim 5, further comprising generating a user interface comprising a textual representation of the association of the topic and the sentiment of interest, wherein determining the first subset of portions is performed in substantially real time during the conversation.

11. The computer-implemented method of claim 5, further comprising:

determining, using the audio-based sentiment model and the audio information, a third subset of portions of the conversation associated with the sentiment of interest;

determining, based on the third subset of portions of the conversation being associated with the sentiment of interest, to generate a second textual representation of a second conversation portion of the third subset of portions of the conversation;

generating the second textual representation of the second conversation portion;

determining, using the text-based topic detection model and the second textual representation, a second topic associated with the second conversation portion; and generating an output distribution representing the topic, a first sentiment associated with first topic, the second topic, and a second sentiment associated with second topic.

12. The computer-implemented method of claim 5, further comprising:

receiving second audio information representing one or more utterances occurring during a second conversation;

determining, using the audio-based sentiment model and the second audio information, a third subset of portions of the second conversation associated with the sentiment of interest;

determining, based on the third subset of portions of the second conversation being associated with the sentiment of interest, to generate a second textual representation of a second conversation portion of the third subset of portions of the second conversation;

generating the second textual representation of the second conversation portion;

determining, using the text-based topic detection model and the second textual representation, a second topic associated with the second conversation portion;

determining the second topic is the same as the topic; and generating second output data representing aggregated sentiment information associated with the topic, the aggregated sentiment information representing a sentiment value associated with the sentiment of interest for the conversation portion and the second conversation portion.

13. The computer-implemented method of claim 5, further comprising:

receiving a plurality of topic categories;

determining, using a second text-based topic detection model and the topic associated with the conversation portion, a topic category of the plurality of topic categories associated with the topic; and generating second output data representing an association of the topic category and the sentiment of interest.

14. A system comprising:

a computer-readable memory and one or more processors, wherein the one or more processors are configured to:

receive audio information representing one or more utterances occurring during a conversation;

determine, using an audio-based sentiment model and the audio information, a first subset of portions of the conversation associated with a sentiment of interest, wherein a second subset of portions of the conversation are not determined to be associated with the sentiment of interest;

determine, based on the first subset of portions of the conversation being associated with the sentiment of interest, to generate a textual representation of a conversation portion of the first subset of portions of the conversation;

generate the textual representation of the conversation portion;

determine using a text-based topic detection model and the textual representation, a topic associated with the conversation portion; and generate output data representing an association of the topic and the sentiment of interest.

15. The system of claim 14 wherein the one or more processors are further configured to:

determine, based on the first subset of portions of the conversation being associated with the sentiment of interest, to generate textual representations of each conversation portion of the first subset of portions; and determine not to generate textual representations of a second conversation portion of the second subset of portions based on the second subset of portions not being determined to be associated with the sentiment of interest.

16. The system of claim 14 wherein to determine the first subset of portions of the conversation are associated with the sentiment of interest comprises the one or more processors are further configured to determine that the conversation portion is associated with a particular sentiment of a plurality of sentiments the audio-based sentiment model is configured to detect.

17. The system of claim 14 wherein to determine the first subset of portions of the conversation are associated with the sentiment of interest comprises the one or more processors are further configured to determine that the conversation portion is associated with a degree of a particular sentiment, the degree exceeding a threshold degree.

18. The system of claim 14 wherein the one or more processors are further configured to:

generate a word cloud comprising first text representing the topic and second text representing a second topic, wherein a first display characteristic of the first text visually indicates the sentiment of interest associated with the topic, and wherein a second display characteristic of the second text visually indicates a second sentiment of interest associated with the second topic.

19. The system of claim 14 wherein the one or more processors are further configured to:

generate a user interface comprising a textual representation of the association of the topic and the sentiment of interest, wherein determining the first subset of portions is performed in substantially real time during the conversation.

20. The system of claim 14 wherein the one or more processors are further configured to:

receive a plurality of topic categories;

determine, using a second text-based topic detection model and the topic associated with the conversation portion, a topic category of the plurality of topic categories associated with the topic; and generate second output data representing an association of the topic category and the sentiment of interest.

* * * * *